United States Patent Office 3,039,995
Patented June 19, 1962

3,039,995
PERFLUOROCYCLOBUTANONE AND SELECTED DERIVATIVES THEREOF
David C. England, Wilmington, Del., assignor to E. I. du Pont de Nemours and Company, Wilmington, Del., a corporation of Delaware
No Drawing. Filed Aug. 28, 1958, Ser. No. 757,701
6 Claims. (Cl. 260—63)

This invention relates to, and has as its principal objects provision of, perfluorocyclobutanone (hexafluorocyclobutanone) and some of its derivatives including its polymers.

This application is a continuation-in-part of my copending application Serial Number 717,805, filed February 27, 1958, and now abandoned.

Ramiraz et al., J. Am. Chem. Soc., 76, 491 (1954), disclose the bromination of cyclobutanone to form 2-bromocyclobutanone, characterized as the dinitrophenylosazone. The halogen in the 2-position is reported to be remarkably less active than that in previously known α-bromoketones and dinitrophenylosazones thereof. Miller in U.S. Patents 2,712,554 and -5 speculatively postulated certain chloropolyfluorocyclobutanones, e.g., 2,2-dichloro-3,4-difluoro-, 2,2 - dichloro - 3,3,4,4 - tetrafluoro-, and 2,2,3,3,4,4-hexachlorocyclobutanones. Actual preparation of some of Miller's theoretical compounds has revealed that they, too, are relatively inert, especially in the formation of polymers.

The novel compound hexafluorocyclobutanone has now been prepared and, in complete distinction from the halogenated cyclobutanones reported previously, found to be quite reactive chemically and to form valuable polymers readily. Derivatives of this novel compound which have also been prepared include the hydrate and the hemiketals thereof, as well as both homopolymers and binary copolymers. Provision of all of these compounds accordingly forms the major object of the invention.

The formulae of the novel butanone and of its hydrate and hemiketals may be written as follows:

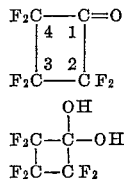

and

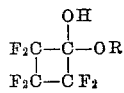

Here R is a monovalent hydrocarbyl radical of generally no more than seven carbons. The structure of the polymers is discussed hereinafter.

The novel ketone can be readily prepared by the direct hydrolysis of the corresponding 1,2,2,3,3,4,4-heptafluoro-1-hydrocarbyloxycyclobutanes, i.e., compounds having the same structure varying only in that the doubly bonded oxygen in the 1-position is replaced by a fluorine atom singly linked to the 1-ring carbon and an external hydrocarbyloxy group also singly linked to said 1-carbon. These intermediates can thus be represented by the structural formula:

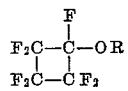

wherein R is a monovalent hydrocarbyl radical, including alkyl, aryl, alkaryl, aralkyl, and cycloalkyl radicals, generally of no more than seven carbons. The hydrolysis of the heptafluorocyclobutyl hydrocarbyl ethers is effected at elevated temperatures in the range 125–300° C. with concentrated sulfuric acid in the range 75–98% pure, and preferably in the range 90–98% pure, for reaction times of from a few to as long as 24 hours or more. For maximum conversion and the highest yields, two molar proportions of water will be present for each molar proportion of ether. Less water can be present but will result in lower conversions, along with attendant recovery of starting material and further handling to effect further hydrolysis. Stoichiometrically, one molar proportion of water is required in the hydrolysis, but, as the ketone forms, it reacts with an extra molar proportion of water to form the ketone hydrate. This desired two molar proportions of water can be supplied to the reaction zone as such or it can be supplied in the sulfuric acid, provided sufficient quantities of the requisite concentration are used. Because of the low boiling point of both the starting ether and the perfluorocyclobutanone product, the acid hydrolysis will preferably be carried out in a sealed reactor or alternative condensing means will be supplied for trapping any ketone formed. The reaction mixture from the hydrolysis, which will comprise the ketone hydrate, any unreacted ether, and allied hydrolysis products, can be converted to the desired ketone by heating in the presence of a strong dehydrating agent, such as phosphorus pentoxide or excess concentrated sulfuric acid, in the respective temperature ranges of 60–100° C. and 100–180° C. or higher. While excess sulfuric acid at the higher temperatures serves as a dehydrating agent, it is generally not possible to so convert all the hydrate, and accordingly for maximum conversions to and yields of the ketones, phosphorus pentoxide will be used.

Perfluorocyclobutanone spontaneously reacts with water to form the hydrate, i.e.,

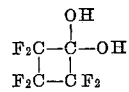

from which it can be regenerated by treatment with $P_2O_5$. The 1,2,2,3,3,4,4-heptafluoro-1-hydrocarbyloxycyclobutane starting materials can be readily obtained by the cyclo-addition of tetrafluoroethylene and a perfluorovinyl hydrocarbyl ether, i.e.:

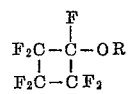

where R is as above. The perfluorovinyl hydrocarbyl ethers can be readily prepared by reacting the appropriate sodium (or other alkali metal) alkoxide with tetrafluoroethylene as illustrated in Example I below. These ethers are generally liquids, with boiling points dependent upon their molecular weight, and are soluble in the common organic solvents such as ether, dioxane and the like.

Perfluorocyclobutanone and some of its derivatives, including the polymers, and processes for the preparation thereof, are illustrated in greater detail but are not to be limited by the following more specific examples in which the parts given are by weight.

EXAMPLE I

*Part A.—Preparation of Perfluorocyclobutyl Methyl Ether*

Each of three thick-walled cylindrical glass reactors roughly 24 diameters long and of total internal capacity corresponding to 150 parts of water was cooled in a liquid nitrogen bath and charged with 11.5 parts of methyl trifluorovinyl ether (for preparation see below), 0.5 part of phenothiazine inhibitor, about 0.5 part of a commercially available terpene stabilizer (see U.S. Patent 2,407,405) and 23 parts of tetrafluoroethylene. The reactors were then sealed and heater to 150° C. and held at this temperature for 12 hours. The sealed reactors were allowed to cool to room temperature, then cooled to liquid nitrogen temperatures, and finally opened to the atmosphere. The reactors were warmed carefully to vent any unreacted tetrafluoroethylene or any tetrafluoroethylene dimer (perfluorocyclobutane) formed during the reaction. The remaining liquid reaction products were combined and fractionated by distillation. There was thus obtained 36.7 parts (57.7% of theory) of perfluorocyclobutyl methyl ether, i.e., 1,2,2,3,3,4,4-heptafluoro-1-methoxycyclobutane, as a clear, colorless liquid boiling at 56° C. at atmospheric pressure; $n_D^{25}$, 1.2875.

*Analysis.*—Calcd. for $C_5H_3F_7O$: F, 62.7%. Found: F, 62.6%.

There was also recovered six parts of the dimer of methyl trifluorovinyl ether, i.e., hexafluorodimethoxycyclobutane, boiling at 114–119° C. at atmospheric pressure.

The methyl trifluorovinyl ether used above can be prepared as follows:

A mixture of 33.3 g. (0.62 mole) of dry sodium methoxide and 155 g. of sodium-dried dioxane is placed in a 320-ml. stainless steel bomb. The bomb is sealed, pressured to 300 p.s.i. with tetrafluoroethylene, and heated to 100° C. under agitation. The bomb is repressured with tetrafluoroethylene as is necessary to maintain 300 p.s.i. of pressure. The reaction is continued until no further decrease in pressure occurs. The bomb is cooled and the exit gas is led into traps immersed in a Dry-Ice acetone bath. The greater portion of the recovered material boils below −20° C. but the trap residue is combined with the contents of the bomb and the combined material is distilled through a 12-inch Vigreux column. Material weighing 30.7 g. and boiling in the range 21–45° C. is collected. This material is redistilled through a 3-foot low temperature column packed with glass helices. Nineteen grams of methyl trifluorovinyl ether, boiling at 10.5–12.5° C., is collected. This product strongly reduces potassium permanganate solution and bromine.

*Part B.—Preparation of Perfluorocyclobutanone Hydrate, i.e., 2,2,3,3,4,4-Hexafluoro-1,1-Dihydroxycyclobutane*

A heavy-walled glass reactor, as described in Example I, Part A, was charged with eight parts of the above perfluorocyclobutyl methyl ether and 18.8 parts of concentrated sulfuric acid. The reactor and contents were then cooled and the reactor sealed and heated at 150° C. for twelve hours. The reactor was then allowed to cool to room temperature, opened, and the substantially homogeneous, light brown, liquid reaction mixture purified by distillation. There was thus obtained 5.9 parts (80% of theory) of perfluorocyclobutanone hydrate, i.e., 2,2,3,3,4,4 - hexafluoro-1,1-dihydroxycyclobutane, as a clear, colorless liquid boiling at 59° C. under a pressure corresponding to 50 mm. of mercury.

*Part C.—Preparation of Perfluorocyclobutanone*

A glass reactor of internal capacity corresponding to 200 parts of water, fitted with a dropping funnel and connected to a trap cooled with a solid carbon dioxide/acetone bath, was charged with 25 parts of phosphorus pentoxide. The reactor and attached system were then evacuated and filled with nitrogen to a pressure corresponding to 200 mm. of mercury. Molten perfluorocyclobutanone hydrate (6.5 parts) was then added through the dropping funnel. On warming the glass reactor an exothermic reaction occurred and the desired perfluorocyclobutanone collected as a crystalline solid in the solid carbon dioxide/acetone-cooled trap. On examination the ketone was found to boil at about 0–1° C. at atmospheric pressure. Infrared and nuclear magnetic resonance spectra were entirely consistent with the perfluorocyclobutanone structure.

*Analysis.*—Calcd. for $C_4F_6O$: F, 64.0%. Found: F, 62.2%, 62.5%.

*Part D.—Preparation of Perfluorocyclobutanone Methyl Hemiketal*

To a trap cooled in a solid carbon dioxide/acetone bath and containing 100 parts of crude perfluorocyclobutane (about 90 parts pure perfluorocyclobutanone with sulfur dioxide impurity) was added 16 parts of methanol (equimolar on the ketone). The trap and the reaction mixture were then allowed to warm to room temperature, during which time the sulfur dioxide contaminant was evolved. The remaining liquid residue was put through a precision fractionation column, and all the material was found to distill at 113° C. at atmospheric pressure. There was thus obtained 103 parts (97% of theory, assuming 90% pure starting material) of the methyl hemiketal of perfluorocyclobutanone, i.e., 1-hydroxy-1-methoxyhexafluorocyclobutane; $n_D^{25}$, 1.3289. The nuclear magnetic resonance spectrum of the pure hemiketal was completely consistent with the ketal structure.

*Analysis.*—Calcd. for $C_5H_4F_6O_2$: C, 28.6%; H, 1.9%; F, 54.3%. Found: C, 29.0%; H, 2.4%; F, 52.9%.

The pure perfluorocyclobutanone was further characterized by alkaline ring scission of the above methyl hemiketal to a mixture of 4H-hexafluorobutyric acid and the methyl ester thereof. Thus, a reactor was charged with 21 parts of the above methyl hemiketal of perfluorocyclobutanone, 25 parts (two molar on the hemiketal) of dimethyl sulfate, and 28 parts (two molar on the hemiketal) of potassium carbonate. On mixing, a spontaneous exothermic reaction occurred. The resultant reaction mixture was separated by fractionation through a precision distillation column. There was thus obtained 16 parts of methyl 4H-hexafluorobutyrate as a clear, colorless liquid boiling at 890 C. at atmospheric pressure; $n_D^{25}$, 1.3170, and four parts of 4H-hexafluorobutyric acid as a clear, colorless liquid boiling at 149° C. at atmospheric pressure; $n_D^{25}$, 1.3158. The nuclear magnetic resonance spectra for the two products were consistent with the ester and acid structures.

*Analysis.*—Calcd. for the acid $C_4H_2F_6O_2$: C, 24.5%; H, 1.0%; F, 58.2%. Found: C, 24.6%; H, 1.2%; F, 57.0%.

The perfluorocyclobutanone was still further characterized by essentially quantitive conversion to perfluorocyclopropane upon irradiation without ultraviolet light. Thus, two thick-walled cylindrical glass reactors, as described in Example I, Part A, varying only in possessing an internal capacity corresponding to 130 parts of water, were charged, respectively, with seven and eleven parts of perfluorocyclobutanone. The reactors were sealed and exposed for sixty hours to the radiation from a commercially available 85-watt mercury arc lamp rated at 2800 lumens (a General Electric H85–C3 lamp). The reactors were then cooled in a liquid nitrogen bath, opened, and the gaseous products vented to the atmosphere. A sample of the gaseous material was examined by infrared spectroscopy and shown conclusively to be carbon monoxide. The liquid reaction products remaining were combined and distilled in a low temperature still. There was thus obtained 10.5 parts (69% of theory) of perfluorocyclopropane, boiling at atmospheric pressure at −32° C. The boiling point and the infrared spectrum of the product agreed with those reported by Haszeldine, J. Chem. Soc., 1953, 3761, who obtained the product in 3% yield by irradiating tetrafluoroethylene with ultraviolet light. The conversion to the perfluorocyclopropane is believed to be essentially quantitative in the present synthesis, and the reported 69% of the theoretical yield is attributed largely to the difficulties in separating and purifying such a low boiling product.

EXAMPLE II

Each of three heavy-walled glass reactors was charged with 15 parts of perfluorocyclobutyl methyl ether and 36.8 parts of concentrated sulfuric acid, sealed, heated at 150° C. for twelve hours, cooled, and finally opened, all as given above in Example I, Part B. The resulting liquid reaction products were combined and distilled at atmospheric pressure through a fractionation column attached to a trap cooled in a solid carbon dioxide/acetone mixture. There was thus obtained from the column water-condenser as a clear, colorless liquid distillate 5.8 parts (13.9% of theory) of perfluorocyclobutanone hydrate, i.e., 2,2,3,3,4,4-hexafluoro-1,1-dihydroxycyclobutane, boiling at 125° C. at atmospheric pressure. There was also obtained in the solid carbon dioxide-cooled trap 28 parts (74.5% of theory) of perfluorocyclobutanone exhibiting a boiling point of 0° C. at atmospheric pressure. The total yield was thus 88.4% of theory.

EXAMPLE III

Each of four heavy-walled glass reactors was charged with twelve parts of perfluorocyclobutyl methyl ether and 36.8 parts of concentrated sulfuric acid, and the reactors were then cooled, sealed, heated at 150° C. for twelve hours, and finally opened, all as described previously in Example I, Part B. The resulting brown, liquid reaction products were combined and transferred to a glass stillpot of internal capacity corresponding to 500 parts of water, cooled in a solid carbon dioxide/acetone bath. Ten parts of phosphorus pentoxide was then added and the stillpot connected to a fractionation column to which was attached a solid carbon dioxide/acetone-cooled trap. The reaction mixture was heated, and after heating strongly, there was obtained in the solid carbon dioxide-cooled trap 36 parts (90% of theory) of perfluorocyclobutanone.

EXAMPLE IV

*Part A.—Preparation of Perfluorocyclobutyl Propyl Ether*

A heavy-walled glass reactor was charged with 14 parts of propyl trifluorovinyl ether and 0.5 part of phenothiazine inhibitor, and the reactor was then cooled in a liquid nitrogen bath, charged with 23.5 parts of tetrafluoroethylene, sealed, heated at 150° C. for 12 hours, cooled, opened, vented to the atmosphere to exhaust unreacted tetrafluoroethylene and possible by-product tetrafluoroethylene dimer, all as described in Example I, Part A. The remaining liquid reaction product was fractionated through a precision still. There was thus obtained 13 parts (54% of theory) of perfluorocyclobutyl propyl ether, i.e., heptafluoro-n-propoxycyclobutane, as a clear, colorless liquid boiling at 90° C. at atmospheric pressure; $n_D^{25}$, 1.3132.

*Analysis.*—Calcd. for $C_7H_7OF_7$; F, 55.4%. Found: F, 55.1%.

The nuclear magnetic resonance spectrum was entirely consistent with the perfluorocyclobutyl propyl ether structure. There was also recovered by distillation two parts of propyl trifluorovinyl ether dimer, i.e., hexafluorodipropoxycyclobutane.

*Part B.—Preparation of Perfluorocyclobutanone Hydrate*

Each of four heavy-walled glass reactors was charged with 10 parts of the above perfluorocyclobutyl propyl ether and 36.8 parts of concentrated sulfuric acid, sealed, heated for eight hours at 150° C., cooled, opened at liquid nitrogen temperature, and allowed to warm to room temperature, all in the manner described in detail in Example I, Part B. On warming to room temperature, it was noted that some silicon tetrafluoride and sulfur dioxide by-products were evolved. The reactors were then individually heated with an open gas flame while attached to a glass trap cooled in a solid carbon dioxide/acetone bath. White crystals of the desired product perfluorocyclobutanone hydrate collected in the trap. The solid product was rinsed out of the trap with ether and then fractionated through a precision distillation column. There was thus obtained 11.6 parts (35.7% of theory) of perfluorocyclobutanone hydrate as a clear, colorless liquid boiling at 126–128° C. at atmospheric pressure. On cooling, the liquid product solidified, and after recrystallization from cyclohexane, the pure perfluorocyclobutanone hydrate was obtained as white crystals melting at 50–52° C.

*Analysis.*—Calcd. for $C_4H_2O_2F_6$: C, 24.5%; H, 1.0%; F, 58.2%. Found: C, 24.0%; H, 1.3%; F, 56.3%.

A sample of the hydrate was titrated with dilute aqueous sodium hydroxide solution, using a pH meter to follow the titration. The product exhibited an indicated pKa value of 6.75 and a neutral equivalent of 195 versus the theoretical value of 196. Upon back titration with acid, the pKa was observed to be about 2, indicating that a ring opening reaction occurred during the neutralization with the aqueous sodium hydroxide forming the sodium salt of 4-hydroperfluorobutyric acid, i.e., 4H-hexafluorobutyric acid.

The cycloaddition reactions involving the fluorovinyl hydrocarbyl ethers and tetrafluoroethylene, as well as the acid hydrolysis of the 1-hydrocarbyloxy heptafluorocyclobutane intermediates, will generally be carried out at elevated temperatures, e.g., of the order of 125 to 200° C. or thereabouts, preferably in closed reaction systems under the autogenous pressure generated.

Reaction times for the various preparative steps will vary within themselves and also with the particular reactivity of the specific intermediates involved. The cycloaddition and the acidic hydrolysis reactions will generally be carried out for six to eighteen hours or thereabouts. The dehydration reaction, where used, will generally be carried out for relatively short periods of time, e.g., one to four hours or thereabouts.

It should be apparent from the foregoing more detailed specific examples that as the conditions for acidic hydrolysis of the heptafluorocyclobutyl hydrocarbyl ether are made more rigorous, i.e., higher temperatures and/or longer times, the relative proportions and, in fact, the specific identity of the product vary. Thus, under the milder conditions, perfluorocyclobutanone hydrate will be at least part of the product; whereas, as the conditions get more rigorous, increasing quantities of the desired perfluorocyclobutanone are obtained.

Perfluorocyclobutanone is very stable to acids even at elevated temperatures, e.g., 150–200° C. It rapidly and spontaneously forms a hydrate and hemiketals. The hydrate readily cleaves upon aqueous base hydrolysis to form 4H-hexafluoro-n-butyric acid. Finally, perfluorocyclobutanone serves as an intermediate to the previously known, but extremely difficultly assessable, hexafluorocyclopropane. Simple illumination with ultraviolet light at room temperature of the perfluorocyclobutanone results in substantially quantitative conversion to the perfluorocyclopropane with the elimination of carbon monoxide.

Additional and specific utilities of perfluorocyclobutanone may be illustrated as follows:

EXAMPLE V

Perfluorocyclobutanone is useful as a water-proofing agent, particularly in waterproofing polyvinyl alcohol, e.g., in shaped object form. This relatively available commercial polymer, while outstanding for many uses, suffers markedly from its severe moisture sensitivity and water solubility. In fact, most of the commercial uses of this polymer depend on these properties. Obviously it would be desirable to be able to modify or control the water sensitivity of the polymer so as to broaden the field of uses thereof to be inclusive of such widespread commercial outlets as transparent wrapping film for perishables, e.g., produce and the like, where moisture sensitivity, water vapor transpirability and, of course, water solubility must be at a minimum. Perfluorocyclobutanone solves these fundamental deficiencies in polyvinyl alcohol quite simply and effectively.

Thus, a one part sample of film, prepared from a commercially available polyvinyl alcohol by conventional casting procedures, was placed in a cylindrical glass reactor and heated therein at steam bath temperatures for a period of one hour under reduced pressure corresponding to 1 mm. of mercury to remove what traces there may have been of trapped water and/or oxygen on the surfaces of and possibly within the film. The reactor was opened and about forty parts of perfluorocyclobutanone was distilled into the reactor. The reactor was then sealed and heated for a period of two hours at steam bath temperatures. The reactor was then cooled to room temperature, opened, and the remaining ketone removed by distillation under reduced pressure. The polyvinyl alcohol film appeared substantially unchanged, retaining both its strength and shape but acquiring a very slight haze during the treatment. The film was placed in liquid water which was then warmed to 60° C. The treated film still retained dimensional stability and substantially its initial strength. In contrast, a control, i.e., untreated, film of polyvinyl alcohol from the same batch of commercial polymer when placed in liquid water partly dissolved almost immediately and in a few minutes became a gel with no definite shape. The treated film was allowed to stand for a period of five days in liquid water. At the end of this time it still retained its initial dimensions, i.e., was dimensionally stable, and likewise appeared to exhibit essentially its initial strength.

EXAMPLE VI

In addition to the above-described waterproofing characteristics, perfluorocyclobutanone exhibits swelling and, in sufficiently high concentrations, solvent action on ester addition polymers, particularly of the polyvinyl type, e.g., polyvinyl acetate. Thus, perfluorocyclobutanone is useful as a plasticizer for such polymers in film and fiber form, and more particularly, is useful as a solvent for such polymers in the preparation of shaped objects therefrom, e.g., in the casting of films or the spinning of fibers and filaments.

To illustrate, a one part strip of film prepared from a commercially available polyvinylacetate was placed in a cylindrical glass reactor and heated at steam bath temperatures for one hour under a reduced pressure corresponding to 1 mm. of mercury to thoroughly free the film sample from adsorbed water and/or oxygen. About forty parts of perfluorocyclobutanone was then distilled into the reactor which was then sealed and heated for two hours at steam bath temperatures. The polyvinylacetate film swelled in the ketone vapors and ultimately dissolved in the liquid ketone. The reactor was then cooled to room temperature, opened, and the perfluorocyclobutanone removed by pumping at reduced pressure. As the ketone was removed, the polyvinylacetate came out of solution in substantially unchanged appearance and was deposited as a film in the bottom of the reactor roughly corresponding to the original liquid level.

As noted previously, the perfluorocyclobutanone of the present invention differs greatly from other perhalocyclobutanones which on the surface would appear to be similar, for instance, the mixed chlorofluoroperhalocyclobutanones such as 2-chloro-2,3,3,4,4-pentafluoro-2,2-dichloro-3,3,4,4-tetrafluoro-, and 2,2,3,4-tetrachloro-3,4-difluorocyclobutanones. The difference is not one of degree but rather is a fundamental one of kind. Thus, perfluorocyclobutanone, as will be described in detail, under various conditions readily polymerizes to a high molecular weight, white, solid, powdery homopolymer. Furthermore, perfluorocyclobutanone readily copolymerizes with other oxocarbonyl and thiocarbonyl monomers. In contrast, under identically the same conditions as applied to the surprising perfluorocyclobutanone of the present invention, and for that matter more broadly under all conditions tried, the mixed chlorofluorocyclobutanones, for instance those of Miller U.S. Patents 2,712,554 and 2,712,555, e.g., 2,2 - dichloro - 3,3,4,4 - tetrafluorocyclobutanone, form no visible or isolatable polymer. Furthermore, even the superficially more closely related 2-chloro-2,3,3,4,4-pentafluorocyclobutanone likewise under all conditions tried forms no visible or isolatable polymer.

Perfluorocyclobutanone not only homopolymerizes but also copolymerizes with other oxo carbonyl and thiocarbonyl monomers, e.g., aldehydes and ketones, particularly perfluoro- and ω-hydroperfluoroaldehydes and -ketones.

In all instances, the polymers and copolymers of perfluorocyclobutanone will be characterized by a plurality of recurring combined units of the ketone in the form of oxy-(perfluorocyclobutylidene) units of the following structure:

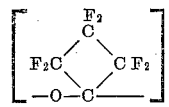

Thus, the structure of these polymers can be regarded as somewhat like a recurring spiro structure. The main chain of the polymer will contain recurring oxygen and carbon atoms along with the combined units of any comonomers being used. The chain carbons of the polymer adjacent the chain oxygen atoms will have both remaining valences satisfied by linkage to the α- and γ-carbons of a perfluorotrimethylene diradical. This peculiar structure is unique and believed responsible for, at least in part, the peculiar properties of these polymers.

The new polymers and copolymers of perfluorocyclobutanone are useful in the formation of shaped objects, e.g., blocks, films, and fibers, by conventional polymer handling techniques, including solvent extrusion, casting or spinning or direct thermal conversion from powder polymer form to shaped object form. The copolymers containing increasing combined oxyperfluorocyclobutylidene units exhibt decreasing solvent solubility. Copolymers containing a majority of such combined units exhibit excellent solvent resistance to most common organic solvents, and accordingly, while more difficultly fabricatable by virtue of this property, they are outstanding for use in those areas of modern industry where high solvent resistance to organic materials is desired, e.g., as packing materials, stuffing box members, bearing, rod, and pump seals in chemical processing and fuel handling equipment, and the like. Generally such items will be fabricated by direct thermal means, including milling, pressing calendering, extrusion, and the like.

In polymerizations and copolymerizations a wide variety of initiators can be used. Thus, in the homopolymerization of perfluorocyclobutanone or in the copolymerization thereof with other monomers containing at least one oxygen or sulfur atom doubly bonded to a single carbon atom, e.g., the aldehydes, thioaldehydes, ketones, thioketones, and the thiocarbonyl and halides, such anionic initiators can be used as: the alkali metal halides, e.g., sodium chloride, sodium fluoride, potassium bromide, cesium fluoride, cesium chloride, rubidium fluoride, and the like; the alkali metal cyanides, e.g., potassium and sodium cyanides; the alkali metal carboxylates, e.g., sodium acetate; the quarternary ammonium salts, e.g., tetraethylammonium chloride; the longer chain quarternary salts, such as lauryl methyl phenylsulfonium methylsulfate; the arylphosphines, e.g., triphenylphosphine; the phosphites, such as triethylphosphite; and the like. These anionic polymerizations are preferably carried out in the presence of organic adjuvants, such as the hydrocarbon ethers, including both acyclic and cyclic, e.g., dimethyl ether, diethyl ether, tetrahydrofuran; N,N-dihydrocarbylmonocarboxamides, e.g., N,N-dimethylformamide; and the like. These anionic polymerizations and copolymerizations are conventionally carried out under dry nitrogen with such initiators under anhydrous conditions at low temperatures, e.g., ranging from liquid nitrogen temperatures to that of solid carbon dioxide (about −80° C.) up to about room temperature. Preferably the reaction temperature is maintained below at least about −50° C.

The anionic homopolymers, which are readily-handled, stable solids, provide a convenient source of the chemically quite reactive and therefore difficultly handleable perfluorocyclobutanone. Thus, when it is desired to react the perfluorocyclobutanone with some other chemical to form new derivatives of the ketone, the solid homopolymer can be heated to elevated temperatures and the monomer thereby generated distilled directly into the reactor being used.

The following details are submitted to illustrate the above-discussed polymers and copolymers, and means for the preparation thereof.

EXAMPLE VII

*Preparation of Poly[Oxy(Perfluorocyclobutylidene)]*

(A) A sample of hexafluorocyclobutanone, prepared as described in Example I above was further purified by conversion to the methyl hemiketal (a clear, colorless liquid boiling at 110–112° C. at atmospheric pressure; freezing point, 4° C.) and regeneration of the hexafluorocyclobutanone from this purified methyl hemiketal by distillation from phosphorus pentoxide. The purified hexafluorocyclobutanone exhibited a boiling point of 3–4° C. at atmospheric pressure and a freezing point of about −58° C.

To a solution at 0° C. of about eight parts of the above purified hexafluorocyclobutanone in about ten parts of anhydrous diethyl ether (dried over sodium) there was added 0.01 part of anhydrous sodium acetate. The mixture was let stand ten minutes at 0° C. under anhydrous conditions and then was cooled by external application of a solid carbon dioxide/acetone bath. Polymerization was apparent within minutes after the reactor was cooled. After sixteen hours under these conditions, a firm, opaque, white gel was present. About 2.2 parts of acetyl chloride was added and the gel broken up mechanically while maintaining the reactor at about −80° C. After ten minutes the mixture was allowed to warm to room temperature, and after one hour at room temperature the reaction mixture was filtered and the solid washed with petroleum ether, diethyl ether, alcohol, and water and finally dried.

There was thus obtained about 2.5 parts of poly[oxy-(perfluorocyclobutylidene)] as a white powder insoluble in such varied solvents as: acetone, methyl and ethyl alcohols, benzene chloroform, methylene chloride, petroleum ether, acetonitrile, acetic acid, acetic anhydride, butyrolactone, sulfuric acid, trifluoroacetic acid, tetramethylurea, and p-chlorophenol, at room temperature and at the boil. The polymer liberates monomer slowly at room temperature and degrades cleanly and rapidly to perfluorocyclobutanone at 200–250° C. X-ray and infrared spectra are consistent with the poly[oxy(perfluorocyclobutylidene)]structure.

(B) To a solution at 0° C. of an additional about 8-part sample of the above purified hexafluorocyclobutanone in about 16 parts of anhydrous diethyl ether (dried over sodium), there was added about 0.5 part of anhydrous dimethylformamide and about 0.5 part of triethyl phosphite. The mixture was let stand about 30 minutes at 0° C. during which time no visible change occurred. The reaction mixture was then cooled by external application of a solid carbon dioxide/acetone bath. Polymerization was apparent within minutes after the cooling bath was applied to the reactor. The reaction mixture was held overnight at solid carbon dioxide/acetone bath temperatures. There was thus obtained after separation of remaining unpolymerized monomer, filtration, and evaporation of the ether medium about 2.0 parts of a solid, white, high molecular weight homopolymer of perfluorocyclobutanone similar to that just previously described.

Substantially identical results were obtained substituting 1.0 part of triphenylphosphine for the triethyl phosphite.

EXAMPLE VIII

*Preparation of Poly[Oxy(Perfluorocyclobutylidene)]*

A glass reactor of internal capacity corresponding to 500 parts of water and fitted with inlet and outlet tubes and a mechanical stirrer was charged with about 70 parts of anhydrous diethyl ether and about 0.15 part of dimethylformamide. The reactor was flushed with nitrogen and then immersed in a solid carbon dioxide/acetone bath. About ten parts of crude, gaseous hexafluorocyclobutanone was slowly passed into the vigorously stirred solution under dry nitrogen. Stirring and cooling were continued for eight hours, and the reaction mixture was then allowed to warm to room temperature. The diethyl ether was evaporated by passing a stream of nitrogen over the surface of the reaction mixture.

There was thus obtained 5.9 parts of a clear gel of poly[oxy(perfluorocyclobutylidene)] in diethyl ether which smelled strongly of monomeric hexafluorocyclobutanone and slowly liquefied when allowed to remain a few hours at room temperature. A sample of this product was heated and the vapors resulting therefrom collected in a condenser cooled to about −80° C. The condensate was separated by distillation into a fraction boiling above room temperature and another boiling below room temperature. The lower boiling fraction was demonstrated to be recovered hexafluorocyclobutanone by comparison of the nuclear magnetic resonance spectrum thereof with that of the known monomer. The higher boiling fraction was a mixture of poly[oxy-(perfluorocyclobutylidene)] of relatively low molecular weight and diethyl ether.

Since obvious modifications in the invention will be evident to those skilled in the chemical arts, I propose to be bound solely by the appended claims.

The embodiments of the invention in which an exclusive property or privilege is claimed are defined as follows:

1. Perfluorocyclobutanone.
2. Perfluorocyclobutanone hydrate.
3. A hemiketal of perfluorocyclobutanone wherein the hemiketal oxygen is attached to a monovalent hydrocarbon radical of up to 7 carbons.
4. Perfluorocyclobutanone methyl hemiketal.
5. A solid homopolymer of perfluorocyclobutanone.
6. The polymer of claim 5 in the form of a self-supporting film.

References Cited in the file of this patent

UNITED STATES PATENTS

| | | |
|---|---|---|
| 2,441,128 | Barrick et al. | May 11, 1948 |
| 2,712,554 | Miller | July 5, 1955 |
| 2,712,555 | Miller | July 5, 1955 |